United States Patent [19]

Kennedy et al.

[11] Patent Number: 6,047,290

[45] Date of Patent: Apr. 4, 2000

[54] COMPUTER IMPLEMENTED PLANNING SYSTEM AND PROCESS PROVIDING MECHANISM FOR GROUPING AND PRIORITIZING CONSUMER OBJECTS BASED ON MULTIPLE CRITERIA

[75] Inventors: Brian M. Kennedy, Coppell; Christopher D. Burchett, Carrollton, both of Tex.

[73] Assignee: i2 Technologies, Inc., Dallas, Tex.

[21] Appl. No.: 09/026,752

[22] Filed: Feb. 20, 1998

[51] Int. Cl.[7] ........................................... G06F 17/30
[52] U.S. Cl. .......................... 707/103; 707/104; 705/1
[58] Field of Search .................... 707/103, 104; 705/1

[56] References Cited

U.S. PATENT DOCUMENTS 5,590,046  12/1996  Anderson et al. ............... 364/474.13
5,771,172  6/1998   Yamamoto et al. ............... 364/468.13
5,819,232  10/1998  Shipman ............................... 705/8
5,854,746  12/1998  Yamamoto et al. ............... 364/468.13

*Primary Examiner*—Thomas G. Black
*Assistant Examiner*—Frantz Coby
*Attorney, Agent, or Firm*—Baker Botts L.L.P.

[57] ABSTRACT

A computer implemented planning system and process are disclosed that providing mechanism for grouping and prioritizing consumer objects based on multiple criteria. The manufacturing of a product is planned using an object model that includes buffer objects. The buffer objects include a grouped flow policy field that specifies a grouping for consumer objects based upon criteria of the consumer objects. In one implementation, a bucketed nested sort flow policy, that is a subclass of the grouped flow policy, is used to specify grouping further based upon start dates. In a further implementation, a bucketed combined sort flow policy, that is a subclass of the bucketed nested sort flow policy, is used to specify grouping further based upon aggregations of criteria values.

30 Claims, 1 Drawing Sheet

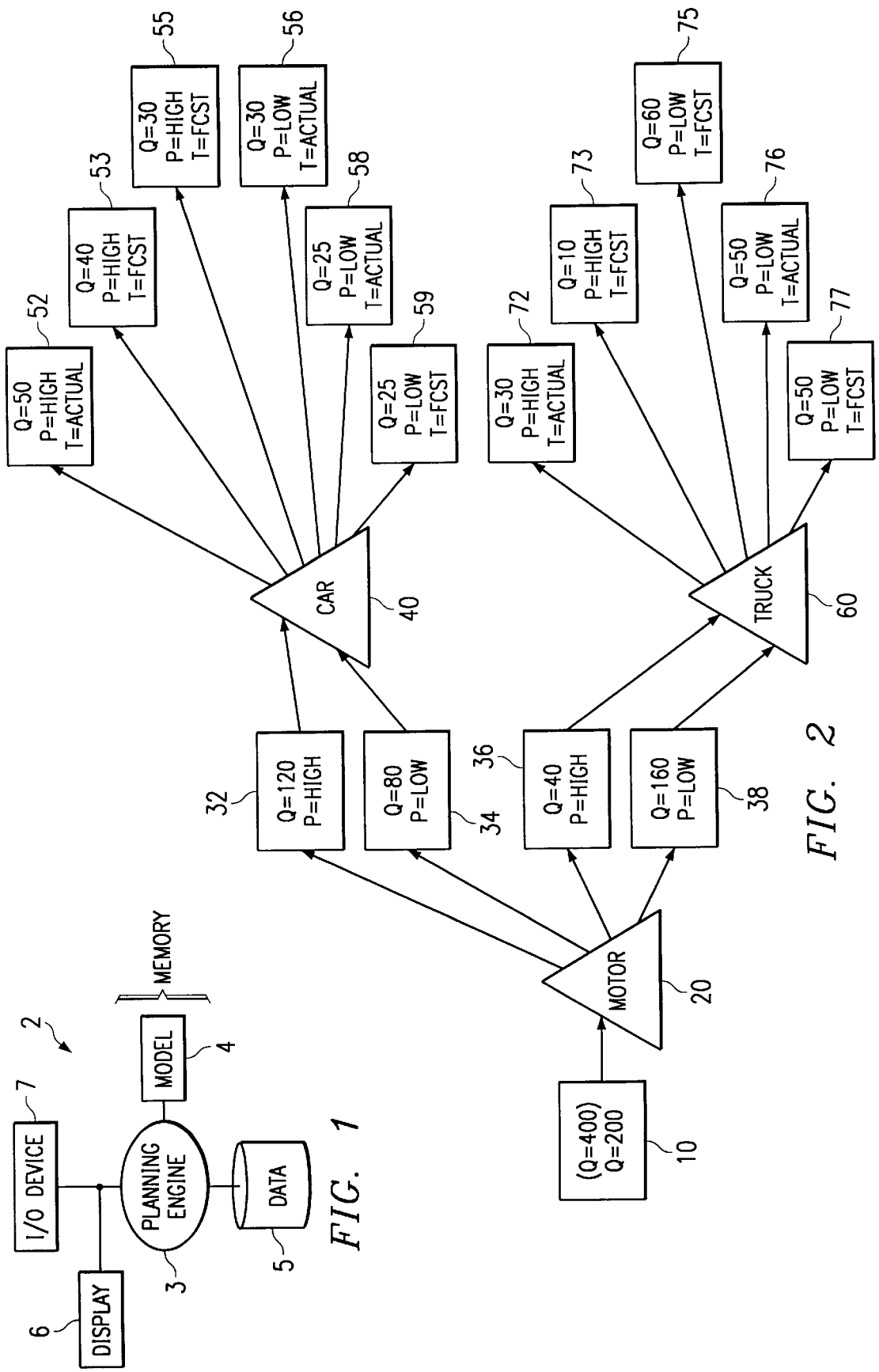

COMPUTER IMPLEMENTED PLANNING SYSTEM AND PROCESS PROVIDING MECHANISM FOR GROUPING AND PRIORITIZING CONSUMER OBJECTS BASED ON MULTIPLE CRITERIA

TECHNICAL FIELD OF THE INVENTION

This invention relates in general to the fields of supply chain management, and single- and multi-enterprise planning. More particularly, the present invention relates to a computer implemented planning system and process providing a mechanism for grouping and prioritizing consumer objects based on multiple criteria.

BACKGROUND OF THE INVENTION

Computer implemented planning systems are widely used for factory, enterprise and supply chain planning functions. In general, the systems model the manufacturing environment and provide plans for producing items to fulfill consumer demand within the constraints of the environment. In modeling, the term "downstream" can be used to refer to moving in the direction of consumers, and "upstream" can be used to refer to moving in the direction of producers. One problem that can occur in planning systems is that all consumer demand can not be fulfilled. In such a case, it is often necessary to make consumers late in terms of when demand is met. However, providing control to users of the planning system as to which consumers to make late downstream while planning producers upstream can be difficult. Thus, it is desirable to provide a more efficient and easily implemented way to control upstream producers based upon characteristics of downstream consumers.

SUMMARY OF THE INVENTION

In accordance with the present invention, a computer implemented planning system and process are disclosed that provide a mechanism for grouping and prioritizing consumer objects based on multiple criteria.

According to one aspect of the present invention, the manufacturing of a product is planned using an object model that includes buffer objects. The buffer objects include a grouped flow policy field that specifies a grouping for consumer objects based upon criteria of the consumer objects. In one implementation, a bucketed nested sort flow policy, that is a subclass of the grouped flow policy, is used to specify grouping further based upon start dates. In a further implementation, a bucketed combined sort flow policy, that is a subclass of the bucketed nested sort flow policy, is used to specify grouping further based upon aggregations of criteria values.

A technical advantage of the present invention is the provision of a mechanism for grouping and prioritizing consumers from an inventory or other source of flow to facilitate an extended level of control over how things are planned by a planning system. Various different criteria can be used to group the consumers, prioritization can be done in and among those groups, and producers can be planned corresponding to one or more of those groups of consumers. The result is a significant level of control over how consumers and producers are planned, and what information can be propagated upstream and downstream thereby facilitating even greater planning knowledge. Such control allows for implementing a variety of practices such as safety stock algorithms and portioning of finite resources over time.

Additional technical advantages should be readily apparent to one skilled in the art from the following figures, descriptions, and claims.

BRIEF DESCRIPTION OF THE DRAWINGS

A more complete understanding of the present invention and advantages thereof may be acquired by referring to the following description taken in conjunction with the accompanying drawings, in which like reference numbers indicate like features, and wherein:

FIG. 1 is a block diagram of a planning system that provides a mechanism for grouping and prioritizing consumer objects based on multiple criteria according to the present invention; and FIG. 2 is a block diagram of one embodiment of objects modeling assembly of a product using a mechanism for grouping and prioritizing consumer objects based on multiple criteria according to the present invention.

DETAILED DESCRIPTION OF THE INVENTION

FIG. 1 is a block diagram of a planning system, indicated generally at 2, that provides a mechanism for grouping and prioritizing consumer objects based on multiple criteria according to the present invention. Planning system 2 can be implemented on a computer system having typical computer components such as a processor, memory, storage devices, etc. In the embodiment of FIG. 1, planning system 2 executes software that implements a planning engine 3 in processor memory. Planning engine 3 maintains and accesses a model 4 of a manufacturing environment or supply chain which planning engine 3 is used to plan. Planning engine 3 has access to data 5 stored in a fixed storage device. Data 5 can be used to initiate planning engine 3 and model 4. However, during operation, planning engine 3 and model 4 are typically maintained in processor memory for speed and efficiency. Planning engine 3 can provide information to a user via display 6 and can receive input data from input devices 7.

Typically, the present invention can be implemented using a variety of software objects. As used herein, an "item" is a unit of raw material or assembled components that flows through the supply chain or manufacturing process. A "buffer" refers to a software object that models the management of the flow of interchangeable items in the supply chain or manufacturing plant. For the most part, material and inventory planning functionality is attached to buffers. A buffer can model all flow of a particular item, or a subset of that. In modeling a supply chain, a buffer typically only models the flow of items at a particular location (an SKU). Smaller subsets can be defined. For example, one buffer could model items at a location to be supplied to a very important customer, while another buffer could models that item supplied to other customer. One buffer could model items at a location built a certain way (e.g., by a U.S. Military-approved resource), while another buffer models the rest. In general, a buffer defines interchangeability, and the items managed by a buffer are interchangeable.

Items flow in and out of a buffer. Input flows can be referred to as "producers," and output flows can be referred to as "consumers". The buffer can provide logic to generate consumers and/or producers as the result of the flow in and out of the buffer. The buffer can manage safety stocks, safety times, lot sizing, and timing. In one implementation, this logic is bundled in a virtual class object called "flow policy", stored in each buffer's "flow_policy" field.

A number of buffer data fields can be used in implementing the present invention. The "flow_policy" field is a class which creates producers given the owning buffer's consumers (and vice versa, in some cases). It also recomputes producers given the owning buffer's changes in consumers. A "consumers" field is a set of consumer flows created by planning system 2, typically working upstream from customer item requests through various buffers and assembly points. Consumers can have both a quantity and a date or date-range of when the items are consumed from the buffer. The "producers" field is a set of producer flows. The "flow_policy" logic describes how these producers are created in response to changes by planning system 2 to the "consumers" field. This logic thus plans the flow of items requested from it by populating "producers". Producers can be generated by the flow policy or generated by some other element of planning system 2. In any case, the flow policy will try to balance the flow of all producers and consumers.

In general, planning system 2 plans customer requests by creating consumer objects at the end item buffer objects. Those buffer objects then plan that work by having their "flow_policies" create producer objects which "match" the consumer objects. Planning those producers may require creating consumers at upstream buffers, and the process works upwards through an "assembly" of buffers. (Other more exotic processes such as disassemblies and catalyst loops can also take place.)

Customer requests can consist of an end item, quantity, due date (or period), and potentially many attributes such as priority which a flow policy might want to reference in determining how to plan consumers given finite resources. For example, a flow policy might be able to build only enough producers to deliver to nine of ten consumers on time. Thus, it must decide which consumer falls late. A low priority or later due date would be good criteria for making a consumer late. Notice that a producer object may be created to deliver to multiple consumer objects. In that case, the priority of that producer object can be some formula of the priorities of the consumer objects. A flow policy is used within buffer objects to model such logic. Further, although the above discussion is generally from the perspective of propagating planning decisions "upstream", supply allocation policies can be enforced "downstream" as well.

The present invention provides a mechanism for grouping and prioritizing consumers from an inventory or other source of flow to facilitate an extended level of control over how things are planned by planning system 2. Various different criteria can be used to group the consumers, prioritization can be done in and among those groups, and producers can be planned corresponding to one or more of those groups of consumers. The result is a significant level of control over how consumers and producers are planned, and what information can be propagated upstream and downstream thereby facilitating even greater planning knowledge. Such control allows for implementing a variety of practices such as safety stock algorithms and portioning of finite resources over time.

FIG. 2 is a block diagram of one embodiment of objects modeling assembly of a product using a mechanism for grouping and prioritizing consumer objects based on multiple criteria according to the present invention. In the embodiment of FIG. 2, a plurality of consumer, buffer and producer objects are used to model and plan the assembly of a particular toy car and a particular toy truck that are each assembled using the same motor.

In the example of FIG. 2, box 10 represents the operation of building 200 motors. Triangle 20 represents the control point for the flow of motors. Such control points can be modeled as buffer objects. The operation of box 10 can be modeled as a producer object that feeds into buffer object 20. Operations 32, 34, 36, and 38 can be modeled as consumer objects from buffer object 20. Operations 32 and 34 are also producer objects into a buffer object 40. Operations 36 and 38 are also producer objects into a buffer object 60. Operation 32 represents the assembly of 120 cars from 120 motors, where the 120 cars feed high priority customers. Operation 34 represents the assembly of 80 cars for low priority customers. Operation 36 represents the assembly of 40 cars for high priority customers, and operation 38 represents the assembly of 160 cars for low priority customers.

Operations 52, 53, 55, 56, 58 and 59 represent orders for cars from customers and are consumer objects from buffer object 40. Operation 52 represents an actual order from a high priority customer for 50 cars. Operation 53 represents a forecasted (predicted) order from a high priority customer for 40 cars. Operation 55 similarly represents forecasted order from a high priority customer for 30 cars. Operation 56 represents an actual order from a low priority customer for 30 cars. Operation 58 represents an actual order from a low priority customer for 25 cars, and operation 55 represents forecasted order from a low priority user for 25 cars.

Operations 72, 73, 75, 76 and 77 represent orders for trucks from customers and are consumer objects from buffer object 70. Operation 57 represents an actual order from a high priority customer for 30 trucks. Operation 73 represents a forecasted (predicted) order from a high priority customer for 10 trucks. Operation 75 similarly represents forecasted order from a low priority customer for 60 trucks. Operation 76 represents an actual order from a low priority customer for 50 trucks, and operation 77 represents a forecasted order from a low priority user for 50 trucks.

Using this scheme, a user can specify that the Car, Truck, and Motor buffers (40, 60, and 20, respectively) are managed, for example, by Bucketed Nested Sort flow policies (which is described below). For the Car and Truck buffers 40 and 60, the user can specify, for example, two criteria: the customer priority (either "High" or "Low") and the type of order (either "Actual" or "Forecast"). Based on those two criteria, up to four groups of consumers could be formed (high priority actuals, low priority actuals, high priority forecasts, and low priority forecasts). In the case of the buffer 40, operation 52 forms one group, operations 53 and 55 form a second group, operations 56 and 58 form a third group, and operation 59 forms a fourth group. In the case of buffer 60, operation 72 forms one group, operation 73 forms a second group, operations 75 and 77 form a third group, and operation 76 forms a fourth group.

The user can also specify that certain criteria should be produced separately. For example, based upon the structure of FIG. 2, the user has specified that the customer priority criteria should be produced separately, whereas the order type should not. As a result, the producer objects generated to satisfy the consumer objects for buffer 40 are split based upon the priorities of the consumer objects. In this case there is one operation generated for each of the two priorities. For example, operation 32 is for the high priority cars and as such has a quantity of 120 which is the sum of the high priority operations 52, 53, and 55. By separating out those operations, they can be stamped with their corresponding priority criteria (either "High" or "Low"). That priority then becomes visible to the decision-making logic in buffer 20. Buffer 20, if specified for example to be Bucketed Nested Sort as well, can then group those operations based on those criteria that were transmitted by the downstream buffers 40 and 60.

This visibility can be important considering what would happen when it is not possible to produce as many motors as desired. In the example of FIG. 2, it is desirable for operation 10 to build 400 motors for use in 200 cars and 200 trucks. Consider the case when it will not be possible to build more than 200 motors. In that case, the planning system will need to reduce the consumer objects by 200 units. A simplistic planning system might choose to distribute the motors evenly across the different toys that need the motors. That would result in building 100 cars and 100 trucks. However, that, in turn, would result in not delivering cars to some high priority customers while delivering trucks to some low priority customers. For some customers, that result would be highly undesirable. By utilizing the present invention, the operations 32, 34, 36 and 38 consuming from buffer 20 are split into high and low priority operations. Thus, when planning the 200 units, the high priority operations can be satisfied first. The result is that 120 cars and 80 trucks are planned to be built (or perhaps some other distribution of the low priority, such as 140 cars and 60 trucks). Then when adjusting the consumer objects at buffers 40 and 60, there will be plenty of both cars and trucks to satisfy all the high priority customers.

Since this invention generalizes to any number of user-defined criteria, it is capable of supporting arbitrarily complex planning logic as far upstream in the production flow as desired. Note that the criteria need not be two-value (e.g., "High" and "Low"). It can be many-valued. For example, the priority criteria could be a number, where a higher number indicates high priority. In that case, the number of groups formed depends upon the number of different priorities that appear in the consumers.

There are various components that provide advantages in implementing the present invention. In one implementation, the invention uses three classes of an object oriented language, with Grouped Flow Policy being the base of BNS Flow Policy, and BNS Flow Policy being the base of BCS Flow Policy. It should be understood that other implementations are within the scope of the invention as well.

In this implementation, "Grouped_Flow_Policy" can be a subclass that organizes the consumers into groups based on any "criteria" of the consumers (including associated attributes. For example, if a consumer ultimately feeds a very high priority request to many buffers downstream, that fact could be referenced in determining the consumer's group. Typically one producer object is created for each group of consumer objects. Other examples of grouping criteria are due date, actual vs. forecast flag for demand, and promised vs. unpromised for fulfilling demand. Many criteria work best for end-item buffer objects, where a value such as the forecast flag comes directly from a consumer's request.

Consumer objects can additionally be grouped by a field "time_criteria" which is a class object that places consumer objects into groups based on an internal algorithm. This criteria can keep the planning engine from creating one producer object feeding consumer objects over the entire time horizon. There are many operating strategies for breaking up producer objects across time. One example value for this field is "BUCKETED_START" which groups together consumer objects whose start dates fall in the same prespecified time bucket. (The bucketed nested sort (BNS) flow policy described below uses this concept.) Other examples can mirror other flow policies, for instance, a "FIXED_TIME" policy that groups consumer objects such that their producer objects occur a fixed minimum time apart from each other. Another example is a "MULTIPLE" policy that groups consumer objects such that their producer objects quantities are an integral multiple of some prespecified quantity and are bounded by a prespecified range of quantities.

Producer objects can be generated to satisfy one or more groups of consumer objects. For each criteria, the "Grouped Flow_Policy" field in the buffer object can store a Boolean flag "produce_separately" which if true demands that the consumers in that group are satisfied by separate producer objects (the producer objects will not also satisfy other groups of consumers). That allows the "Grouped Flow_Policy" to annotate those producer objects with the criteria of the group they satisfy. This, in turn, allows upstream planning algorithms to use those criteria to do own planning.

As consumer objects are created, they can be placed in groups. As these objects are changed, they are can be moved to new groups as appropriate. A field "consumer_group_policy" can be used to determine the groups given a buffer's consumers and their criteria. A default policy for this can be "CROSS_PRODUCT" which causes the creation of a group for every combination of values of the criteria. For example, if there are two criteria "rank" and "due_date," and various consumer objects have ranks 1, 2, or 3 and due dates Jan. 1, 1998 or Feb. 1, 1998, then there are six groups: (1, Jan. 1, 1998), (2, Jan. 1, 1998), (1, Feb. 1, 1998), etc.

A field "production_policy" can be used to determine the number, quantity, and "producing_operation" of producer objects to be planned to supply the consumer objects. Whenever an external request is made to plan a consumer objects, "production_policy" can be used to create the producer objects. A simple "production_policy" is "ONE_PRODUCER_PER_GROUP" which creates one producer object per consumer group.

A field "safety_stock_policy" is an object class "Safety Stock_Policy" which describes additional material that should be planned when the producer objects are created. The material can be recomputed whenever the producer objects are recomputed (which happens when consumer objects change). "Safety_Stock_Policy" can be designed for implementing various safety stock schemes. Given the list of groups, the action of "Safety_Stock_Policy" can depend on the value of a field "new_producers". If true, "Safety_Stock_Policy" indicates that one or more new producer objects should be created to supply safety stock, based on whatever algorithm is implemented internally by the given "Safety_Stock_Policy" subclass. At the same time, new producer objects can be given a due date. If false, "Safety_Stock_Policy" indicates that one or more of the buffer's producer objects should be selected and increases their quantities to supply safety stock, again based on internal algorithms of the subclass. At the same time, the "Safety_Stock_Policy" may adjust the due dates of these producer objects. The discussion of BNS below discusses a use of a "Portion_Of_Next_Group_SSP" for an example subclass of "Safety_Stock_Policy" that computes safety stock for time buckets based on the amount of consumers of the previous time bucket.

A Bucketed Nested Sort (BNS) Flow Policy can be a subclass of "Grouped Flow_Policy" which stores a "horizon" that which is a set of time buckets. The consumer objects can be grouped into these buckets based on their start dates (which are computed based on their runtime and downstream motivating buffer or request due date). The consumer objects can e Further grouped by the criteria discussed above under "Grouped_Flow_Policy" such as due date and actual vs. forecast. (Note: BNS can achieve the time bucket groupings through the BUCKETED_START "time_criteria" value described above.) BNS can default the "safety_stock_policy" to a "Safety_Stock_Policy" subclass appropriate for time buckets called "Portion_Of_Next_Bucket_SSP". This subclass can have two fields:

"fixed_ending_on_hand" and "per_next_ending_on_hand" which determine for a given time bucket of consumer objects their safety stock quantity. This quantity can be calculated as: "fixed_ending_on_hand"+("per_next_ending_on_hand" * N), where N is the total consuming quantity of the next time bucket. The due date for the safety stock can simply be the end date of the time bucket. The safety stock value may be frozen at the current value if the "lock_ending_on_hand" field is given a value of true. After such a freeze, changes in consumer objects do not affect the safety stock value. "Ending_on_hand" can be a field whose value defaults to the above computation. However, if a user sets this field, the new value can become a fixed safety stock target which overrides the computation.

Several groups of consumer objects may occupy a given time bucket. Their combined safety stock can be planned via a new producer if the "Grouped_Flow_Policy" "new_producers" field is true or if there are no consumer objects in the time bucket. Otherwise the safety stock can be planned by increasing the production quantity of a selected producer object. The producer object of the group having the highest priority value among criteria having "produce_separately" set true can then be selected. (Criteria value priority is discussed below.) This works well under the assumption that the safety stock is going to satisfy the highest priority consumer objects in the next bucket. Then the producer objects in the next bucket can satisfy the rest of the consumer objects in that bucket plus the highest priority consumer objects in the next bucket. Then in the last bucket it can be assumed that the bucket beyond the horizon will look just like the last bucket.

In addition to the "upstream planning" features discussed so far, BNS can provide a critical mechanism for intelligently performing "downstream planning". When finite resources indicate that a producer can not be planned on time to supply its consumer objects, downstream planning decides which consumer objects are made late. Upstream planning matched producer objects to consumer objects based on the groupings, which were determined by the time bucket and by the criteria having a true value for "produce_separately". Downstream planning can be more selective than these groupings, choosing a consumer object to make late based on criteria having a false value for "produce_separately". If a producer object is made late or short and it was generated for a "produce_separately" group, then consumer objects from that group can be adjusted accordingly. If the producer object made late or short was not for a "produce_separately" group, then consumers from any of the groups can be adjusted. In that case, the lower priority groups will tend to be adjusted first.

The selection can be made based on criteria value priority, so that the lowest priority consumer objects are the first to be made late. The highest priority consumer objects are the most likely to be planned on time. For example, suppose the "produce_separately" field is set to "true" for the criteria "actual vs. forecast" and "promised vs. unpromised". In general, "actual" is valued higher priority than "forecast", and "promised" is valued higher priority than "unpromised". (Planners typically prefer giving resources to actual orders ver forecasted orders and promised orders over unpromised orders.) Suppose there is also a criteria called "due date", but "produce_separately" is set to false for "due date". Due date is can be ignored by upstream planning, which can create four groups of consumer objects:

1. actual, promised orders (highest priority)
2. actual, unpromised orders (next highest priority)
3. forecast, promised orders (third highest priority); and
4. forecast, unpromised orders (lowest priority). For each group having at least one consumer object, producer objects are planned to supply material to the group, during upstream planning.

Downstream planning can be employed should the material not be available on-time. Suppose enough material can be supplied to cover all the group #1 consumer objects and one of two group #2 consumer objects. A decision needs to be made as to which of the group #2 consumer objects should be made late. An intelligent downstream planner can decide to look at the other criteria, which in this case is "due date". The planning engine can make the consumer with the lowest priority "due date" value late, which (as formulated in one implementation of BNS) is the one with the later due date. The criteria can be kept in a list which expresses the relative priority of criteria. So if "customer mood" were a criteria that was earlier in the list than "due date", it would be consulted before "due date" in determining which consumer objects to make late.

Using BNS, consumer objects are effectively sorted according to the prioritized list of criteria, which act as nested sort keys. Changing or reordering the criteria changes the sorted order of the consumer objects; thus, changing which consumer objects would receive their full supply and which would be shorted in a supply shortage. Also, if desired, BNS can be instructed to not move forecast consumer objects out into another time bucket. Instead the BNS can short the forecast consumer objects.

Another aspect of BNS can be an "allocate_excess" field. "Allocate_excess" refers to a BNS policy functionality that allows the buffer to create consumer objects for any excess material. "Allocate_excess" first ensures that all consumer objects (both forecast and actual) are satisfied in the current bucket. However, once this condition is met, the excess material in the current bucket can be used to cover any material shortages which might exist in later buckets. After such material shortages are covered, consumer objects in the current bucket can be created to move the remaining excess downstream. This feature can be very valuable for allocation and available-to-promise (ATP) based order promising.

A Bucketed Combined Sort (BCS) Flow Policy can be a subclass of BNS "Flow_Policy" that operates just like BNS but stores a math formula for each criteria to make the groupings based on aggregations of the criteria values. Thus, for example, a formula could be established for the due date criteria which groups consumer objects having due dates which fall in the same calendar week. If due date values are very scattered, this can provide a great convenience to the user of the planning system and also a computational advantage to automated planning, because it minimizes the number of producer objects created during upstream planning.

For example, suppose a buffer object has 1000 consumer objects with due dates falling on 1000 distinct dates over a 20 week period. This situation might arise in applications where the due date is created from the exact date and time of a customer request. A BNS flow policy whose criteria is simply these due dates would split consumer objects into 1000 different groups, making for unmanageable graphic display and expanding the size of the planning problem for an automated planner. Instead, the buffer object could be assigned a BCS flow policy whose criteria value is a formula on these due dates where the a group is created for any due date falling on the same calendar week. Thus the buffer would create at most 20 consumer groups, one for each week in which at least one due date is present. During downstream planning, such aggregations can be ignored when deciding which consumer objects to make late. For example, suppose several consumer objects had the same aggregate due date (such as week #3) but different actual due dates (such as Feb 2nd vs. Feb 4th). The system could prefer making the Feb 4th consumer late. The use of criteria weightings is an example of a math formula which can be particularly valuable in a BCS policy.

Although the present invention has been described in detail, it should be understood that various changes, substitutions and alterations can be made hereto without departing from the spirit and scope of the invention as defined by the appended claims.

What is claimed is:

1. A computer implemented planning system, comprising: a memory operable to store an object model that comprises two or more buffer objects, one or more producer objects each having one or more resources, and one or more consumer objects each having one or more criteria; and a processor operable to execute a planning engine to plan manufacturing of a product using the object model, the buffer objects operable to generate the producer objects according to criteria of the consumer objects and to supply the consumer objects according to resources of the producer objects, the buffer objects further operable to specify a grouping for the consumer objects based upon criteria of the consumer objects.

2. The planning system of claim 1, wherein:

the buffer objects further comprise a bucketed nested sort flow policy that is a subclass of the grouped flow policy; and the bucketed nested sort flow policy specifies grouping further based upon one or more start dates.

3. The planning system of claim 2, wherein:

the buffer objects further comprise a bucketed combined sort flow policy that is a subclass of the bucketed nested sort flow policy; and the bucketed combined sort flow policy specifies grouping further based upon aggregations of one or more criteria values.

4. A computer implemented planning process, comprising:

planning the manufacturing of a product using an object model that comprises two or more buffer objects, one or more producer objects each having one or more resources, and one or more consumer objects each having one or more criteria;

generating the producer objects according to criteria of consumer objects;

supplying the consumer objects according to resources of the producer objects; and specifying a grouping for the consumer objects based upon criteria of the consumer objects.

5. The planning process of claim 4, further comprising defining a bucketed nested sort flow policy that is a subclass of the grouped flow policy to specify grouping further based upon one or more start dates.

6. The planning process of claim 5, further comprising defining a bucketed combined sort flow policy that is a subclass of the bucketed nested sort flow policy to specify grouping further based upon aggregation of one or more criteria values.

7. A computer implemented planning process, comprising:

modeling the flow of items in a manufacturing process using two or more buffers objects;

modeling the flow of items into the buffer objects using one or more producer objects each having one or more resources;

modeling the flow of items out of the buffer objects using one or more consumer objects each having one or more criteria;

generating the producer objects according to criteria of the consumer objects using the buffer objects; and grouping the consumer objects into one or more groups based on criteria of the consumer objects, wherein the producer objects are generated for the groups of consumer objects.

8. The process of claim 7, wherein the items comprise a raw material, and a producer object is operable to model the flow of the raw material.

9. The process of claim 7, wherein the items comprise an assembled component, and a consumer object is operable to model the flow of the assembled component.

10. The process of claim 7, wherein the criteria comprise one or more time criteria, and grouping further comprises grouping the consumer objects based on the time criteria of the consumer objects.

11. The process of claim 7, wherein the criteria comprise one or more start dates, and grouping further comprises grouping the consumer objects based on the start dates of the consumer objects.

12. The process of claim 7, wherein grouping further comprises grouping the consumer objects based on an aggregation of the criteria of the consumer objects.

13. The process of claim 7, further comprising supplying the consumer objects according to resources of the producer objects.

14. The process of claim 13, wherein at least one of the producer objects is generated for only a corresponding group of consumer objects.

15. The process of claim 13, wherein a first producer object is generated for a first group of consumer objects, a second producer object is generated for a second group of consumer objects and for a third group of consumer objects, and supplying further comprises supplying the consumer objects of the first group based on criteria of the second group of consumer objects.

16. The process of claim 13, wherein the criteria of the consumer objects comprise one or more priority levels.

17. The process of claim 13, wherein the criteria of the consumer objects comprise one or more priority levels, and supplying further comprises supplying the consumer objects according to resources of the producer objects based on the priority levels.

18. The process of claim 13, wherein the criteria of the consumer objects comprise a time criterion, and supplying further comprises supplying the consumer objects according to resources of the producer objects based on the time criterion.

19. A planning engine, comprising:

two or more buffers objects operable to model the flow of items in a manufacturing process;

one or more producer objects operable to model the flow of items into the buffer objects, each producer object having one or more resources; and one or more consumer objects operable to model the flow of items out of the buffer objects, each consumer object having one or more criteria, wherein the consumer objects are grouped into one or more groups based on criteria of the consumer objects, and the buffer objects generate producer objects for the groups of consumer objects according to criteria of the consumer objects.

20. The planning engine of claim 19, wherein the items comprise a raw material, and a producer object is operable to model the flow of the raw material.

21. The planning engine of claim 19, wherein the items comprise an assembled component, and a consumer object is operable to model the flow of the assembled component.

22. The planning engine of claim 19, wherein the criteria comprise one or more time criteria, and the consumer objects are grouped into groups based on the time criteria of the consumer objects.

23. The planning engine of claim 19, wherein the criteria comprise one or more start dates, and the consumer objects are grouped into groups based on the start dates of the consumer objects.

24. The planning engine of claim 19, wherein the consumer objects are grouped into groups based on an aggregation of the criteria of the consumer objects.

25. The planning engine of claim 19, further comprising the consumer objects are supplied according to resources of the producer objects.

26. The planning engine of claim 25, wherein at least one of the producer objects is generated for only a corresponding group of consumer objects.

27. The planning engine of claim 25, wherein a producer object is generated for a first group of consumer objects, a producer object is generated for a second group of consumer objects and for a third group of consumer objects, and the consumer objects of the first group are supplied based on criteria of the second group of consumer objects.

28. The planning engine of claim 25, wherein the criteria of the consumer objects comprise one or more priority levels.

29. The planning engine of claim 25, wherein the criteria of the consumer objects comprise one or more priority levels, and the consumer objects are supplied according to resources of the producer objects based on the priority levels.

30. The planning engine of claim 25, wherein the criteria of the consumer objects comprise a time criterion, and the consumer objects are supplied according to resources of the producer objects based on the time criterion.

* * * * *